UNITED STATES PATENT OFFICE.

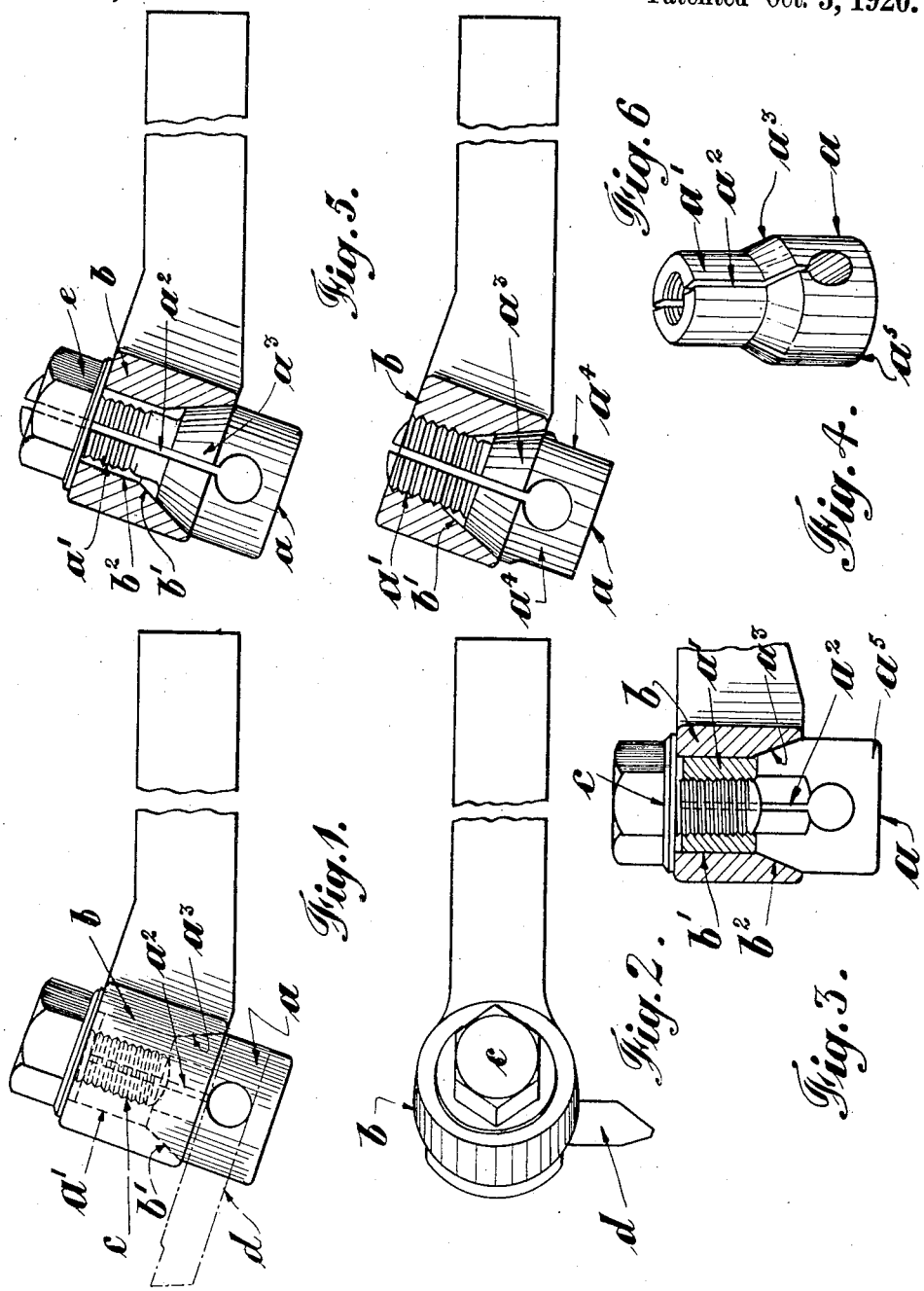

CHARLES WHITFIELD, OF KETTERING, ENGLAND.

TOOL-HOLDER.

1,354,636. Specification of Letters Patent. Patented Oct. 5, 1920.

Application filed January 26, 1920. Serial No. 354,010.

*To all whom it may concern:*

Be it known that I, CHARLES WHITFIELD, a subject of the King of Great Britain and Ireland, and resident of Kettering, Northamptonshire, England, have invented certain new and useful Improvements in Tool-Holders, of which the following is a specification.

This invention refers to tool holders comprising a tool bar and a tool holder proper, this latter on being tightened up, gripping the tool and becoming fixed relatively to the bar. The present invention consists of an improved form of the tool holder proper (hereinafter referred to as the holder) whereby a powerful grip on the tool can be obtained, while the holder is also firmly held relatively to the tool bar.

According to the invention, the holder is made to substantially the same form as usual, with one end enlarged and having a through transverse opening for the tool, the part adjacent to the enlarged end being formed conical to engage a like part of the hole in the tool bar, and the remaining part of the holder next the conical part being parallel-sided and constituting the stem of the holder. Instead however of the holder being slit longitudinally from said wider end as heretofore, it is slit from the narrower end, *i. e.* through the stem part, the conical part, and that part of the wider end between the tool opening and the conical part, the slit terminating in the tool opening, and lying in a plane parallel with the sides of the tool opening.

After placing the stem of the holder in the hole in the bar, suitable means are provided to draw the holder further into the hole in the tool bar, whereupon the segments of the holder, under the pressure upon their free ends, firmly grip the tool, while the holder is held firmly against rotation relatively to the tool bar.

The invention will be more particularly described by the aid of the accompanying drawings wherein:

Figure 1 is a side elevation of a tool holder constructed according to the invention.

Fig. 2 is a plan of Fig. 1 of which

Fig. 3 is a sectional elevation, and

Fig. 4 is a detail view of the tool holder proper removed.

Figs. 5 and 6 are sectional elevations of modified forms of the improved tool holder.

Referring to Figs. 1 to 4, the stem $a'$ of the holder $a$ prior to being slit at $a^2$ is bored longitudinally and tapped interiorly, its exterior being plain and fitting a corresponding plain parallel part $b'$ of the hole in the tool bar $b$.

Screwing into the bore of the holder stem $a'$ is a screwed stud $c$, the head of the stud lying normally next the upper face of the tool bar and the hole in the bar $b$ being slightly longer than the stem $a'$ of the holder $a$ to allow of the tightening up of the stud $c$. Upon further screwing the stud $c$ into the bore of the stem $a'$ the holder $a$ is drawn farther into the hole in the bar, whereupon the conical part $a^3$ of the holder $a$, on meeting the like conical part $b^2$ of the hole, causes the segments of the holder to approach each other and grip the tool $d$ shown dotted. A slight clearance is left between the threads of the stud and those of the holder stem to allow for the closing in of the segments of the stem.

In another example of the invention illustrated in Fig. 5, the holder stem $a'$ is screw threaded on its exterior, and a nut $e$ screws on to the stem and bears against the tool holder when required to tighten the holder.

In a further example of the invention illustrated in Fig. 6, the holder stem $a'$ is adapted to screw into the hole in the tool bar, the holder being formed to allow of its being rotated relatively to the bar, flats $a^4$ being provided for the purpose.

As in known tool holders, the conical part of the improved holder and the conical part of the hole in the tool bar may be made circular, or other than circular, except in the latter case when the holder is adapted to rotate relatively to the bar.

There may be more than one slit, one lying in a different plane than another, and the improved holder may have the usual slit or slits extending through the wider end to a point near the stem, but lying in planes at an angle to the slit $a^3$ which extends through the stem of the holder as indicated at $a^5$ Figs. 3 and 4.

What I claim is:—

1. A tool holder comprising a tool bar having a through hole formed with a conical part to coact with a conical part on a tool holder, a tool holder formed with a conical part and a shank adapted to enter the through hole in the bar, said holder having a transverse opening to receive the tool and being split from the shank end to the tool opening, means being provided to draw the holder into the bar, substantially as described.

2. A tool holder comprising a tool bar having a through hole formed with a conical part to coact with a conical part on a tool holder, a tool holder having a complemental conical part and formed with a shank adapted to enter a through hole in the bar, said holder having a transverse opening to receive the tool and being split from the shank end to the tool opening in the same plane as the axis of the tool opening, means being provided to draw the holder into the bar, substantially as described.

3. A tool holder comprising a tool bar having a through hole formed with a conical part to coact with a conical part on a tool holder, a tool holder having a complemental conical part and formed with a shank adapted to enter a through hole in the bar, said holder having a transverse opening to receive the tool and being split from the shank end to the tool opening and split through the wider end to a point near the stem in a plane at an angle to the slit which extends through the stem of the holder, means being provided to draw the holder into the bar, substantially as described.

4. A tool holder comprising a tool bar having a through hole formed with a conical part to coact with a conical part on a tool holder, a tool holder having a complemental conical part and formed with a shank adapted to enter a through hole in the bar, said holder having a transverse opening to receive the tool and being split from the shank end to the tool opening and slit through the wider end to a point near the stem in a plane at an angle to the slit which extends through the stem of the holder, screwed means being provided to draw the holder into the bar, substantially as described.

5. A tool holder comprising a tool bar having a through hole formed with a conical part to coact with a conical part on a tool holder, a tool holder having a complemental conical part and formed with a shank adapted to enter a through hole in the bar, said holder having a transverse opening to receive the tool and being split from the shank end to the tool opening and slit through the wider end to a point near the stem in a plane at an angle to the slit which extends through the stem of the holder, the shank of the tool holder proper being formed with an external screw thread to receive a nut which bears against the top of the bar to secure the tool in position, substantially as described.

CHARLES WHITFIELD.